United States Patent
Gideon et al.

(10) Patent No.: US 10,183,735 B2
(45) Date of Patent: Jan. 22, 2019

(54) WINDOW FRAME ASSEMBLY FOR AIRCRAFT

(71) Applicant: The Boeing Company, Chicago, IL (US)

(72) Inventors: David E. Gideon, Edmonds, WA (US); Ian E. Schroeder, Seattle, WA (US); Kristin L. Hall, Sammamish, WA (US); Kin M. Ng, Bothell, WA (US); Megan C. Kinney, Seattle, WA (US); Greg M. Reyneke, Bothell, WA (US); Randall D. Wilkerson, O'Fallon, MO (US); Richard R. Rosman, Seattle, WA (US); Aaron W. Bartel, Portland, OR (US)

(73) Assignee: THE BOEING COMPANY, Chicago, IL (US)

( * ) Notice: Subject to any disclaimer, the term of this patent is extended or adjusted under 35 U.S.C. 154(b) by 376 days.

(21) Appl. No.: 15/012,325

(22) Filed: Feb. 1, 2016

(65) Prior Publication Data
US 2017/0217560 A1    Aug. 3, 2017

(51) Int. Cl.
*B64C 1/14* (2006.01)

(52) U.S. Cl.
CPC .................................. *B64C 1/1492* (2013.01)

(58) Field of Classification Search
CPC ....... B64C 1/1492; B64C 1/1484; B64C 1/14; Y02T 50/433
See application file for complete search history.

(56) References Cited

U.S. PATENT DOCUMENTS

| | | | |
|---|---|---|---|
| 5,988,566 A * | 11/1999 | Meyer | B64C 1/1492 244/129.3 |
| 6,905,094 B2 * | 6/2005 | Dazet | B64C 1/1492 244/129.1 |
| 7,988,094 B2 | 8/2011 | Ostrem et al. | |
| 8,449,709 B2 * | 5/2013 | Modin | B29C 70/54 156/211 |
| 9,415,854 B2 * | 8/2016 | Yokoi | B60J 10/16 |
| 9,682,766 B2 * | 6/2017 | Apdalhaliem | B64C 1/1484 |

(Continued)

FOREIGN PATENT DOCUMENTS

| | | |
|---|---|---|
| EP | 1995046 A2 | 11/2008 |
| EP | 2572977 A1 | 3/2013 |
| WO | 2006119002 A2 | 11/2006 |

OTHER PUBLICATIONS

European Patent Office; Extended European Search Report; European Patent Application No. 16191104.5 dated May 26, 2017.

*Primary Examiner* — Valentina Xavier
(74) *Attorney, Agent, or Firm* — Parsons Behle & Latimer (57) ABSTRACT

A window frame assembly for an aircraft, includes a window frame of composite material, adapted for attachment in a window opening of an aircraft, having an outer flange with an exterior surface and an interior surface, a metal erosion shield attached to the exterior surface of the outer flange, and a polymer adapter ring, attached to the interior surface of the outer flange. The window frame has a substantially constant thickness, and the erosion shield has a substantially constant cross-sectional shape. The adapter ring has a sloped engagement surface configured for supporting a window pane assembly.

22 Claims, 5 Drawing Sheets

(56) References Cited

U.S. PATENT DOCUMENTS

| | | | | |
|---|---|---|---|---|
| 2007/0194177 | A1* | 8/2007 | Coak | B64C 1/1492 |
| | | | | 244/129.3 |
| 2012/0119031 | A1* | 5/2012 | Ainsworth | B64C 1/1492 |
| | | | | 244/129.3 |
| 2013/0043348 | A1* | 2/2013 | Milliere | B64C 1/1492 |
| | | | | 244/129.3 |
| 2014/0314973 | A1* | 10/2014 | Desroches | B64C 1/1492 |
| | | | | 428/34 |
| 2014/0319276 | A1* | 10/2014 | Yokoi | B64C 1/1492 |
| | | | | 244/129.3 |
| 2016/0362168 | A1* | 12/2016 | Busscher | B64C 1/1484 |

* cited by examiner

WINDOW FRAME ASSEMBLY FOR AIRCRAFT

FIELD OF THE DISCLOSURE

The present disclosure relates to aircraft windows. More particularly, the present disclosure provides a composite window frame assembly with a metal erosion shield, which is simpler and lighter than prior window assemblies.

BACKGROUND

Typical commercial aircraft include numerous windows that are distributed along both sides of the fuselage from the front of the aircraft to just before the tail. The fuselage is tubular and varies in diameter or radius between the forward and aft ends of the aircraft, and correspondingly the size and curvature of the windows can also vary along the length of the aircraft. Each window includes an outer window frame mounted in a corresponding aperture in the external skin of the aircraft, and each outer window frame supports a corresponding exterior window pane assembly. In a finished aircraft, an inner window assembly is typically mated with the outer window assembly and the inside of the external skin, and connects to interior wall panels of the aircraft.

Typical aircraft skins are made of high strength metal, such as aluminum, or, more recently, carbon fiber composite materials. The outer window assembly and the skin of the aircraft fuselage combine to form a pressure vessel, which contains the pressurized interior environment when the aircraft is at altitude. It is therefore desirable that an outer window assembly of an aircraft have sufficient mechanical strength to withstand the pressure and other mechanical loads that it will face.

To provide the desired strength, aircraft window frames have typically been made of high strength metal. Metals, however, tend to be relatively heavy, and aircraft weight directly affects aircraft efficiency during flight. Accordingly, materials, components and assemblies, including aircraft window assemblies, are being continually developed for reducing aircraft weight while providing sufficient strength of the various aircraft components. In recent years, for example, aircraft manufacturers have developed aircraft designs and fabrication methods that make greater use of composite materials, including reinforced thermoplastics such as carbon fiber reinforced plastic ("CFRP"), and carbon fiber composite materials, such as graphite/epoxy.

Reinforced thermoplastic and composite materials can be significantly lighter than traditional aircraft materials (e.g. aluminum, titanium, steel and alloys of these), while still providing high strength in a variety of aircraft applications. Reinforced thermoplastic and composite materials have been applied in various ways to aircraft window structures. Some of these, however, can be relatively complicated to fabricate and install, and present the possibility for further weight reduction. Additionally, some prior window frame assemblies can be costly, and in some cases are susceptible to cracking from fatigue and during fastener installation.

The present application seeks to address one or more of the above issues.

SUMMARY

It has been recognized that it would be advantageous to develop an aircraft window frame structure that is strong, yet simple in design and simple to install.

It has also been recognized that it would be advantageous to have an aircraft window frame structure that is lightweight.

In accordance with one aspect thereof, the present disclosure provides a composite window frame assembly for an aircraft. The window frame assembly includes a window frame of composite material, adapted for attachment in a window opening of an aircraft, having an outer flange with an exterior surface and an interior surface, a metal erosion shield attached to the exterior surface of the outer flange, and a polymer adapter ring, attached to the interior surface of the outer flange. The window frame has a substantially constant thickness, and the erosion shield has a substantially constant cross-sectional shape. The adapter ring has a sloped engagement surface configured for supporting a window pane assembly.

In accordance with another aspect thereof, the present disclosure provides a composite window frame assembly for an aircraft that includes a window frame and an adapter ring. The window frame is of composite material with a substantially uniform thickness and cross-sectional shape, and includes an inner flange, an outer flange, a metal erosion shield and an annular rim integrally disposed between the inner flange and the outer flange and defining a window pane opening. The inner flange has an exterior surface adapted for attachment to an inner surface of an aircraft fuselage at a window opening. The outer flange has an exterior surface, an interior surface and a distal end with an inner beveled edge. The erosion shield has a substantially symmetrical shape relative to a vertical axis, and is attached to the exterior surface of the outer flange. The adapter ring is attached to the interior surface of the outer flange, and has a sloped inner surface that is substantially aligned with the inner beveled edge of the outer flange. The sloped inner surface of the adapter ring is configured for supporting a window pane assembly within the window pane opening.

In accordance with yet another aspect thereof, the present disclosure provides an outer window assembly for an aircraft. The outer window assembly includes a window frame adapted for attachment in a window opening of an aircraft fuselage, having an outer flange with an exterior surface and an interior surface, a metal erosion shield, attached to the exterior surface of the outer flange, and a polymer adapter ring, attached to the interior surface of the outer flange. The window frame is of composite material, and defines an outer window pane opening, and has a substantially uniform thickness and cross-sectional shape. The erosion shield if of substantially constant cross-sectional shape, and the adapter ring has a sloped inner surface. An outer window pane assembly is mounted upon the sloped inner surface of the adapter ring within the outer window pane opening.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Figure 1:
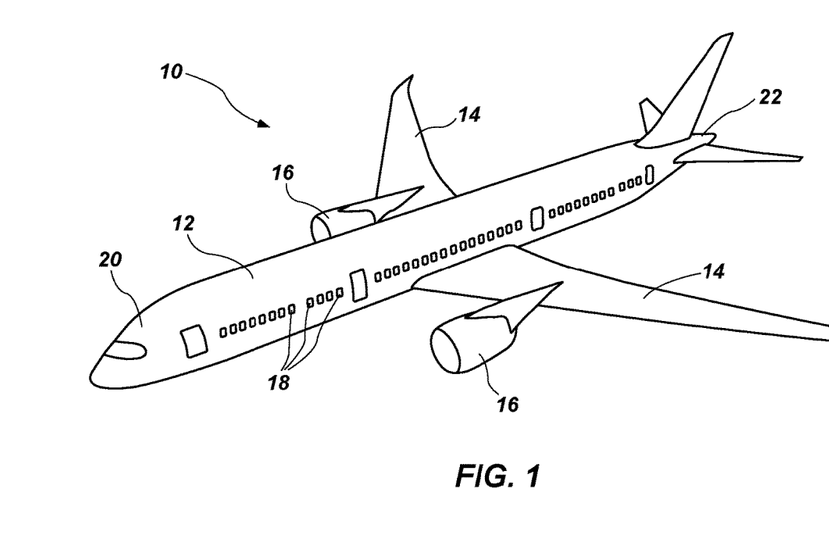
FIG. 1 is a perspective view of an aircraft.

Shown in FIG. 1 is an exemplary aircraft 10 having a fuselage 12, a wing 14, and powered by gas turbofan engines 16. The aircraft includes numerous windows 18 arranged in rows along both sides of the fuselage 12 from the forward cockpit end 20 of the aircraft to just before the aft tail 22. The windows 18 maintain the pressure integrity of the cabin and protect the passengers therein from the external environment, including the fast stream of air flowing over the outer skin during flight.

Figure 2:
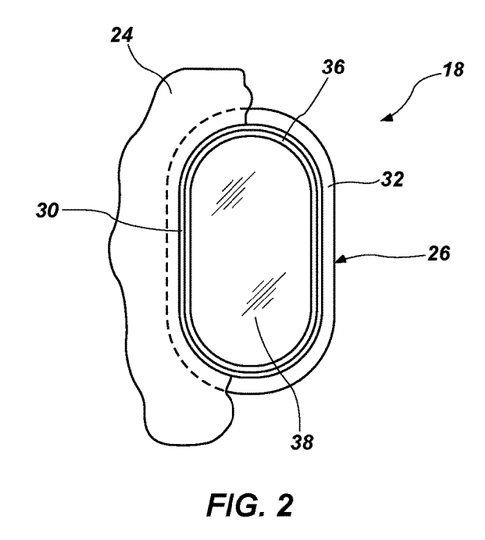
FIG. 2 is a partial sectional, detail view of a single window of the aircraft of FIG. 1.

Referring to FIGS. 1 and 2, each window 18 is suitably mounted through a corresponding aperture 36 in the aircraft skin 24. The windows 18 can vary in size and configuration along the length of the aircraft 10, depending upon the size, shape and curvature of the aircraft skin 24 at any given location. Each window 18 is specifically sized and configured to match the local curvature of the aircraft skin 24 at a given location, and therefore many differently sized windows 18 can be used for each aircraft 10, and are manufactured with corresponding differences.

FIG. 2 shows an exemplary window assembly 18 in a partial sectional plan view. Each window assembly 18 includes a window frame 26 in which is suitably mounted a conventional, transparent window pane 38. The frame 26 includes an outer portion 30 that is exposed between the exterior of the skin 24 of the aircraft and the window pane 38, and an inner portion 32, shown partially in dashed lines in FIG. 2, which is secured against the inside surface of the aircraft skin 24. The frame 26 is suitably mounted through the corresponding aperture 36 in the aircraft skin 24 and supports the pane 38 therein.

Figure 3:
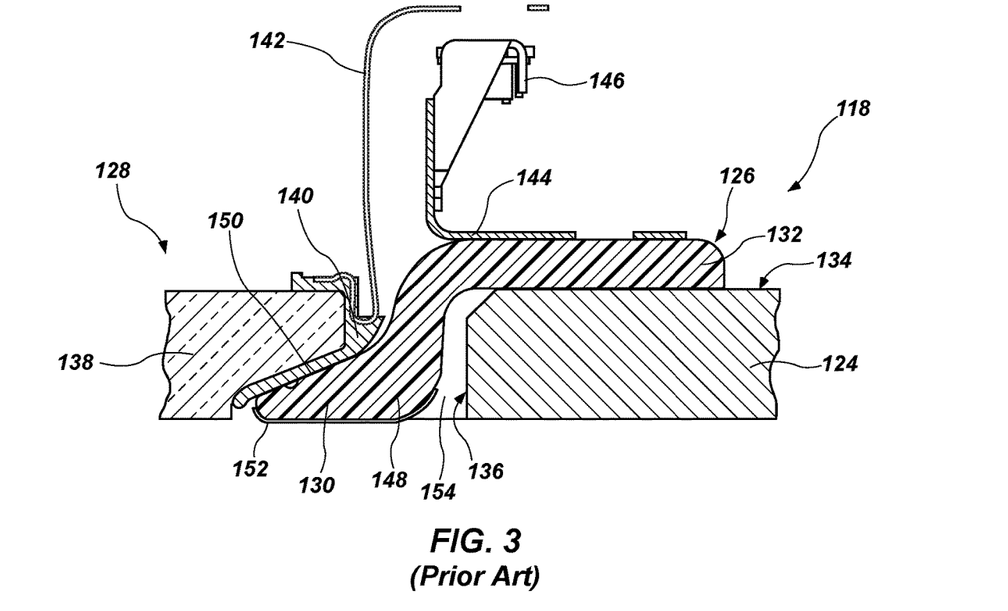
FIG. 3 is a cross-sectional view of a portion of a prior art aircraft window frame assembly, showing a portion of an attached window pane assembly and hardware for interconnecting to an interior window assembly and interior aircraft wall panels.

There are a variety of configurations that have been used for aircraft window assemblies and their frames. Shown in FIG. 3 is a cross-sectional view of a portion of a prior aircraft outer window assembly 118. This outer window assembly 118 generally includes a window frame 126 that supports a window pane assembly 128. The window frame 126 has a generally "S" shape, with an interior flange 132 that is mounted to an interior surface 134 of the aircraft skin 124, and an outer flange 130 that extends through the window opening 136 in the skin 124. The window pane assembly 128 includes a window pane 138 and a perimeter frame 140. A spring clip 142 is attached to the perimeter frame 140, and a bracket 144 with a nut plate 146 is attached to the interior flange 132 of the window frame 126. The spring clip 142 and bracket 144 extend into the interior of the aircraft (10 in FIG. 1), and are configured to allow attachment of an interior window assembly and interior aircraft wall panels (not shown).

The outer flange 130 of the window frame 126 is thickened in region 148 relative to the interior flange 132, and the inside surface 150 of the outer flange 130 is sloped in order to directly support the sloped perimeter frame 140 of the window pane assembly 128. A metal foil (e.g. titanium) erosion shield 152 is bonded to the exterior surface of the outer flange 130 to protect the polymer window frame 126 from the environment, and an aero seal material 154 is provided to fill the gap between the aircraft skin 124 and the erosion shield 152 and window frame 126 on the outside.

Window frames of the sort shown in FIG. 3 have been fabricated of polymer materials, such as carbon fiber reinforced plastic ("CFRP"), which can be lighter than a comparable metal window frame. One widely used CFRP material is known as Hexcel Molding Compound, which is available from Hexcel Corporation of Stamford, Conn. This type of CFRP material can be reinforced with internal wire fabric (e.g. brass wire fabric). However, in order to have sufficient mechanical strength, this type of window frame is relatively thick, which adds to its weight. Additionally, the sloped interior face of the outer flange gives this window frame 126 a cross-sectional shape that varies in thickness, which limits the fabrication methods that are suitable.

As noted above, it is desirable that aircraft window structures be strong and lightweight, and relatively simple to fabricate and install. It is also desirable that such assemblies be low cost, and resistant to cracking from fatigue and during fastener installation.

Figure 4:
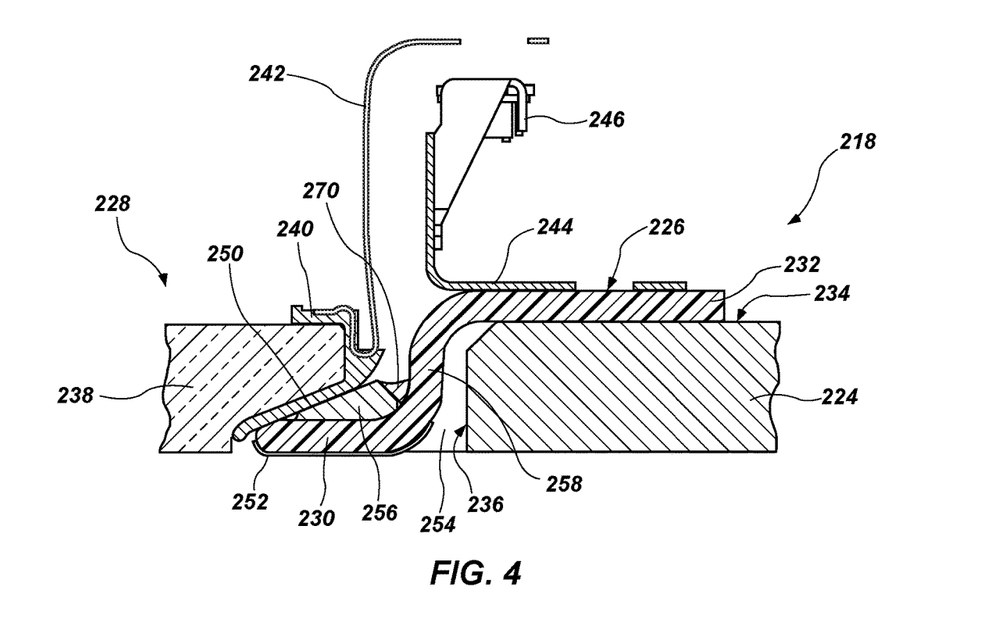
FIG. 4 is a cross-sectional view of a portion of an aircraft window assembly having a composite aircraft window frame in accordance with the present disclosure.
Figure 5:
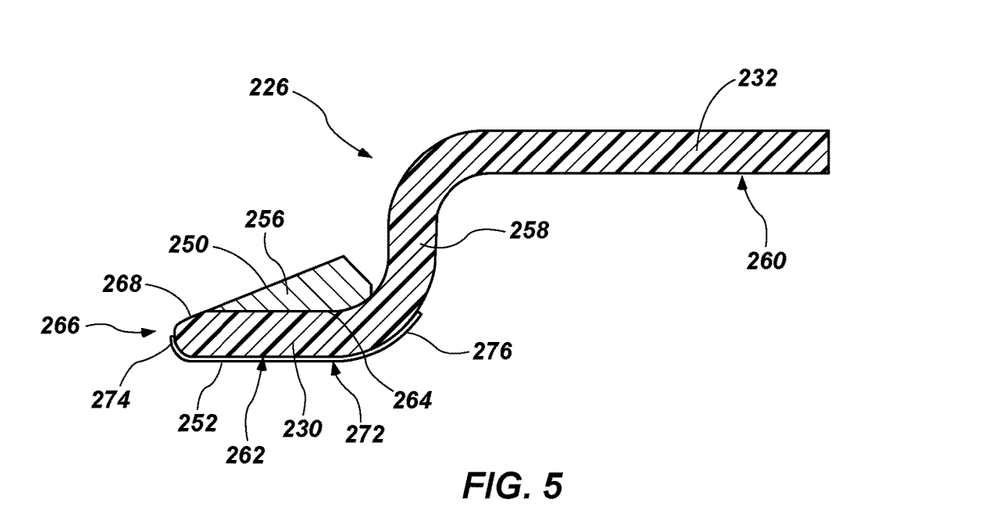
FIG. 5 is a cross-sectional view of the window frame assembly of FIG. 4.
Figure 6:
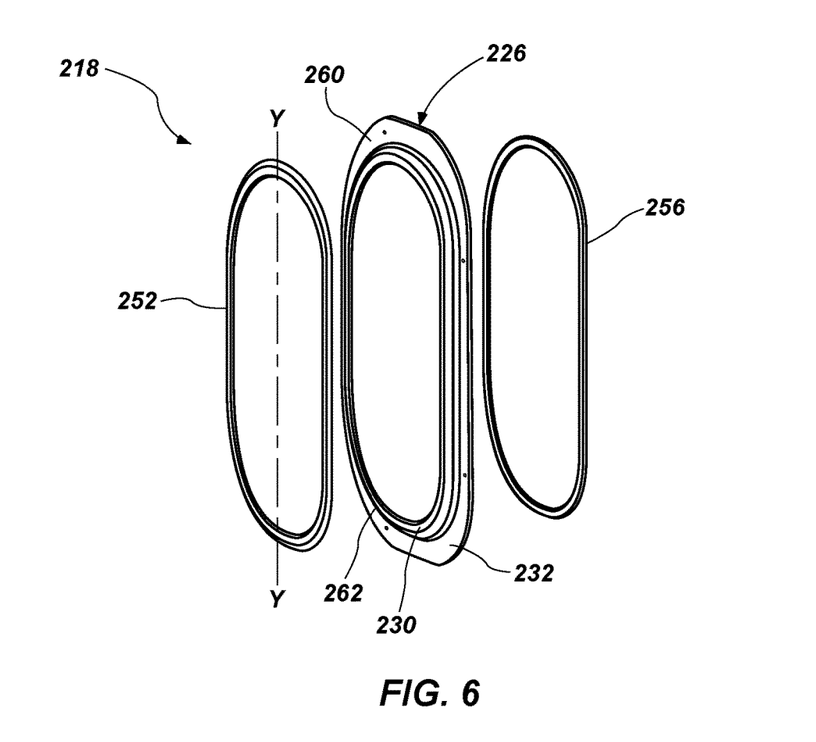
FIG. 6 is an exploded perspective view of the window frame assembly of FIG. 5.
Figure 7:
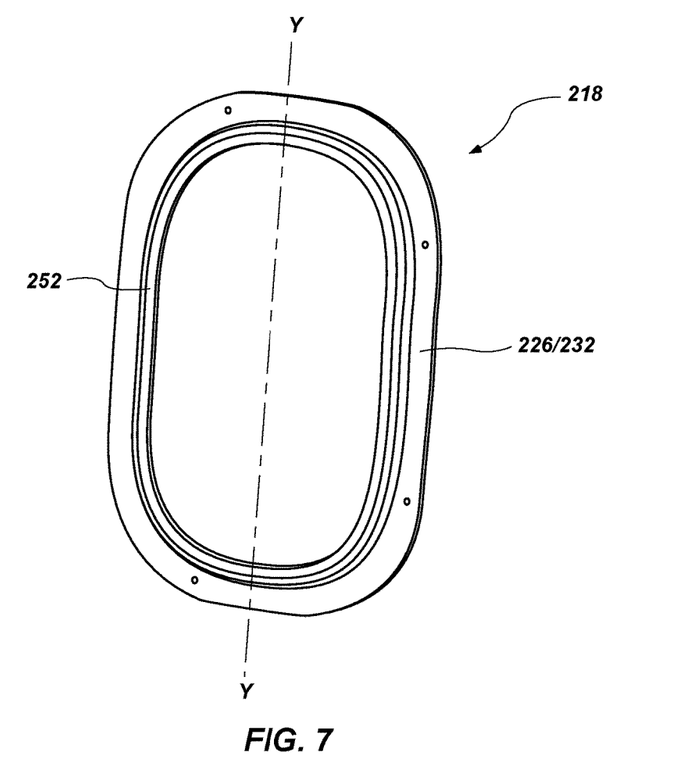
FIG. 7 is a perspective view of an assembled composite window frame assembly in accordance with the present disclosure.
Figure 8:
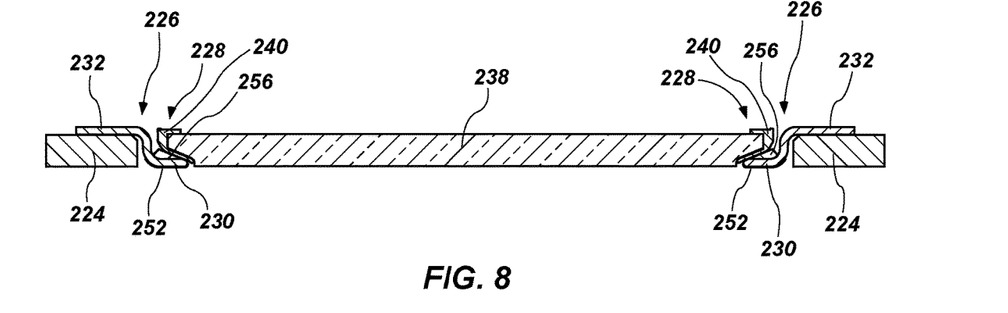
FIG. 8 is a cross-sectional view of an installed aircraft window frame assembly in accordance with the present disclosure, showing an installed window pane assembly.

Advantageously, the present disclosure provides a composite window frame assembly for an aircraft that addresses some of the issues presented by prior window frame assemblies. Provided in FIG. 4 is a cross-sectional view of a portion of an aircraft outer window assembly 218 having a composite aircraft window frame 226 in accordance with the present disclosure, and FIG. 5 provides a cross-sectional view of just the window frame 226 of FIG. 4 and its immediately related components. An exploded perspective view of the window frame 226 and related components is shown in FIG. 6, and a perspective view of the same in an assembled condition is shown in FIG. 7. A complete cross-sectional view of an installed outer window frame assembly 226 and window pane assembly 228 is shown in FIG. 8.

Referring to FIGS. 4-6, an outer window frame assembly 218 in accordance with the present disclosure generally includes a window frame 226, an adapter ring 256, and a metal erosion shield 252. Like the window assembly of FIG. 3, the window frame assembly 218 is configured to support a window pane assembly 228, as shown in FIGS. 4 and 8. As shown in FIGS. 4 and 8 and discussed above, the window pane assembly 228 includes a window pane 238 and a perimeter frame 240. A spring clip 242 or other attachment device can be attached to the perimeter frame 240, and a bracket 244 with a nut plate 246 can be attached to the interior flange 232 of the window frame 226. The spring clip 242 and bracket 244 can be configured to allow attachment of an interior window assembly and interior aircraft wall panels (not shown).

Referring to FIGS. 4-8, the window frame assembly 218 includes a window frame 226 of composite material, such as continuous fiber thermoplastic or thermoset material, adapted for attachment in the window opening 236 of the aircraft (10 in FIG. 1). As shown most clearly in FIG. 5, the window frame 226 has a generally "S" shape, with an inner flange 232, an outer flange 230, and an annular rim portion 258 integrally disposed between the inner flange 232 and the outer flange 230. The annular rim portion 258 can be viewed as defining the window pane opening. The inner flange 232 has an exterior surface 260 adapted for attachment to the inner surface 234 of the skin 224 (shown in FIG. 4) of the aircraft fuselage (12 in FIG. 1) at the window opening 236. The outer flange 230 has an exterior surface 262, an interior surface 264 and a distal end 266 with an inner beveled edge or beveled surface 268.

The window frame 226 has a substantially uniform thickness and cross-sectional shape. In one embodiment, the window frame can have a thickness ranging from 0.04" to 0.33", and more particularly from 0.043"to 0.324, depending upon the overall size of the window assembly. The term "substantially uniform thickness" is intended to mean a window frame in which the inner flange 232, the rim portion 258 and the outer flange 230 have cross-sectional thicknesses that vary relative to each other by no more than about ±10%. Because of its shape characteristics, the material of the frame can be a polyetherketoneketone ("PEKK") material. This material is advantageous in that it can be laid-up as a flat assembly of layers, which can then be stamp-formed to obtain the desired shape. The stamp forming process is a rapid consolidation cycle that is varied by time, temperature and pressure. This fabrication process avoids some of the characteristics associated with some other methods such as mold forming, etc., which involve more steps and more time for fabrication, curing, etc. of the window frame 226. Other materials can also be used for the window frame, such as polyphenylene sulfide (PPS), polyetheretherketone (PEEK), Nylon, thermoset epoxy and other composite materials, as well as metals such as aluminum and titanium. Processes other than stamp-forming can also be used for the window frame, such as compression molding and autoclave curing of a thermoset material.

As most clearly shown in FIG. 5, an adapter ring 256 is attached to the interior surface 264 of the outer flange 230. The adapter ring 256 has a generally triangular cross-sectional shape, with a mating surface that is configured to be bonded to the inner surface 264 of the outer flange 230 of the window frame 226. The adapter ring also includes a sloped inner engagement surface 250 that is positioned to be substantially aligned with the inner beveled edge 268 of the outer flange 230 when the adapter ring 256 is attached to the window frame 226. More specifically, the inner beveled edge 268 is generally contiguous and coplanar with the sloped inner surface 250 of the adapter ring 256. The sloped surface 250 of the adapter ring 256 is configured for supporting the sloped side surface of the perimeter frame 240 of the window pane assembly 228, as can be seen in FIG. 4. In a complete installation, as shown in FIGS. 4 and 8, the perimeter frame 240 of the outer window pane assembly 228 is mounted upon the sloped inner surface 250 of the adapter ring 256 within the outer window pane opening 236.

The adapter ring 256 is of polymer material, which can be filled or unfilled. For example, the adapter ring 256 can be injection-molded of carbon reinforced polyetheretherketone (PEEK). One particular material that can be used is polyetheretherketone (PEEK) with a 30% carbon filler. Other reinforcement materials can also be used, such as glass fiber and particulate reinforcement. This material can have a melt viscosity of 1200 to 1800 poises, for example, though the melt viscosity can vary. Other possible materials for the adapter ring 256 include polyaryletherketone (PAEK), PPS, PEKK, Nylon, polyetherimide, polyamide-imide, polyamide, polycarbonate, polyurethane, thermoset epoxy and other composite materials. A 30% carbon-filled PEEK material is considered suitable because of its mechanical properties and environmental durability. The percentage of carbon filler can vary from 0% to about 40%.

As shown in FIG. 4, a fillet seal 270 can be provided between the adapter ring 256 and the annular ring portion 258 of frame 226. The fillet seal 270 can be a polysulfide material. A suitable polysulfide material for this application is PR-1776M Class B, available from PPG Aerospace of Sylmar, California. This polysulfide sealant material has an ability to flex with the assembly, and for ease and simplicity in manufacturing, can be used in many locations in the window frame assembly. The adapter ring 256 can be attached to the outer flange 230 of the window frame 226 with an adhesive or sealant, such as the polysulfide sealant mentioned above. Other adhesives or sealants can also be used. A primer, such as chrome-free epoxy primer or two-component polyamide primer, can be applied to the window frame 226 and cured prior to application of the polysulfide sealant in order to promote adhesion of the sealant. The primer helps promote bonding of the thermoplastic adapter ring 256 to the interior surface 264 of the outer flange 230. That is, the polysulfide sealant will provide a stronger bond between the window frame 226 and the adapter ring 256 with application of the primer than without it. It is to be understood, however, that the adapter ring 256 can be bonded to the window frame 226 without the application of a primer layer.

As shown in FIGS. 4-6, the metal erosion shield 252 is attached to the exterior surface 262 of the outer flange 230. The erosion shield 252 can be a ring of annealed titanium alloy foil, having a thickness of from 0.003" to 0.1". The erosion shield can be die-cut or laser-cut or produced by some other method. The erosion shield 252 can be bonded to the window frame 226 with polysulfide sealant, which has a high peel strength to help prevent the erosion shield 252 from peeling away from the frame 226. The erosion shield 252 has a substantially constant cross-sectional shape and a substantially symmetrical shape relative to a vertical or "Y" axis, designated in FIGS. 6 and 7. The erosion shield 252 generally includes an outer face 272, an inner lip 274, and an outer curved edge 276. As shown in FIG. 4, an aero seal material 254 (e.g. polythioether aerosealant, or polysulfide sealant) can be provided to fill the gap between the aircraft skin 224 and the outer curved edge 276 of the erosion shield 252 and the underlying portion of the window frame 226 at the edge of the window opening 236.

The inner lip 274 and the outer curved edge 276 of the erosion shield 252 curve no more than 90° relative to the outer face 272 of the erosion shield 252 or of the window frame 226, either at the inner lip 274 or the outer curved edge 276. This provides a symmetric inner lip 274 all around the perimeter of the erosion shield 252, which facilitates installation. This shape is advantageous for installation of the erosion shield 252 upon the outer flange 230 of the window frame 226 because there is no hook-shaped inner lip or similar structure that must be forced past the inner edge 266 of the outer flange 230 of the window frame 226 on one side, as is present in some other configurations of aircraft window frames The integrated composite window frame assembly disclosed herein thus provides a composite window frame that can be stamp-formed thermoplastic material with a bonded adapter ring and metal foil rain erosion shield. A primer coat, applied to the window frame, promotes adhesion and bonding of the adapter ring. The window frame assembly also includes a symmetric inner lip, which facilitates installation.

The inner lip of the window frame design is altered to have a flat edge for simple installation of the symmetric titanium rain erosion foil.

The window frame configuration shown in FIGS. 4-8 can be a drop-in replacement for current window frames, such as that shown in FIG. 3. It is believed that this window frame assembly will provide a cost and weight savings for the associated aircraft. This window frame design is believed to be unique at least in part because of its incorporation of the adapter ring, the bonding process for bonding the adapter ring and erosion shield, and the CFRP material properties. Prior metal window frame assemblies tend to be heavier. Additionally, some prior thermoset window frames are more costly, and can be susceptible to cracking in some circumstances.

Figure 9:
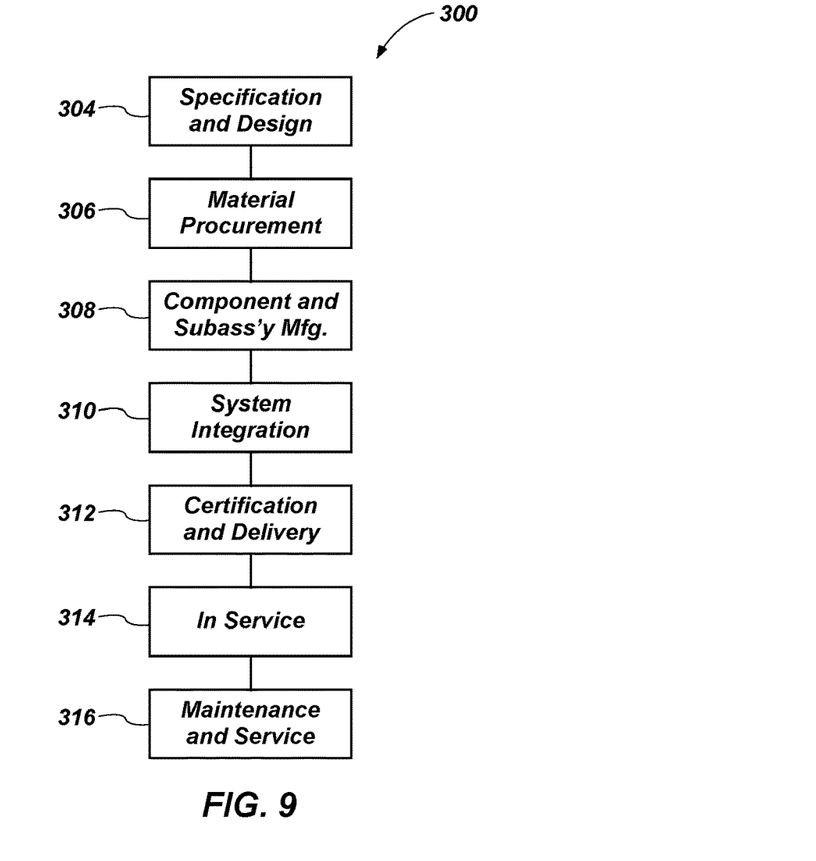
FIG. 9 is a flow diagram of aircraft production and service methodology.
Figure 10:
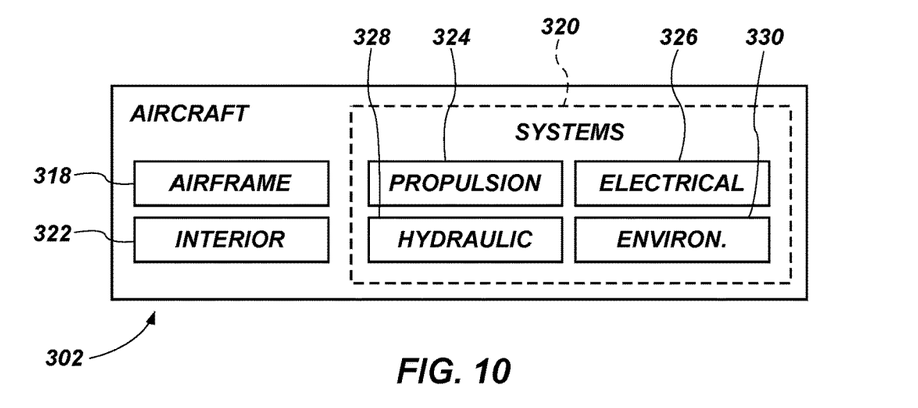
FIG. 10 is a block diagram of an aircraft.

Embodiments of the disclosure may be described in the context of an aircraft manufacturing and service method 300 as shown in FIG. 9 and an aircraft 302 as shown in FIG. 10. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service, for example and without limitation, to maintenance and service 316.

Although various embodiments have been shown and described, the present disclosure is not so limited and will be understood to include all such modifications and variations are would be apparent to one skilled in the art.

What is claimed is:

1. A window frame assembly for an aircraft, comprising:
a window frame of composite material, having a substantially uniform thickness, adapted for attachment in a window opening of an aircraft, the window frame including an outer flange having an exterior surface and an interior surface;
a metal erosion shield, of substantially constant cross-sectional shape, attached to the exterior surface of the outer flange; and
a polymer adapter ring, attached to the interior surface of the outer flange, having a sloped engagement surface configured for supporting a window pane assembly.

2. The window frame assembly of claim 1, wherein the window frame comprises stamp-formed polyetherketoneketone (PEKK) material.

3. The window frame assembly of claim 1, wherein the window frame has a substantially uniform thickness in a range of 0.04" to 0.33".

4. The window frame assembly of claim 1, wherein the window frame further comprises:
an inner flange, having an exterior surface adapted for attachment to an inner surface of a fuselage of the aircraft at the window opening; and
an annular rim, integrally disposed between the inner flange and the outer flange, defining a window pane opening.

5. The window frame assembly of claim 1, wherein adapter ring comprises an injection-molded ring of carbon-filled polyetheretherketone (PEEK) material.

6. The window frame assembly of claim 1, wherein the adapter ring is bonded to the interior surface of the outer flange with a polysulfide sealant.

7. The window frame assembly of claim 6, further comprising a cured primer layer, disposed upon the interior surface of the outer flange, the polysulfide sealant being disposed between the cured primer layer and the adapter ring.

8. The window frame assembly of claim 1, further comprising an inner beveled surface at a distal end of the outer flange, the inner beveled surface being substantially contiguous and coplanar with the sloped engagement surface of the adapter ring.

9. The window frame assembly of claim 1, wherein the erosion shield comprises a die-cut titanium alloy ring.

10. The window frame assembly of claim 1, wherein the erosion shield includes an outer face, an inner lip and an outer curved edge, each of the inner lip and the outer curved edge having an arc of not more than 90° relative to the outer face, the inner lip adapted to mate with a distal end of the outer flange.

11. A window frame assembly for an aircraft, comprising:
a window frame of composite material, having a substantially uniform thickness and cross-sectional shape, including
an inner flange, having an exterior surface adapted for attachment to an inner surface of an aircraft fuselage at a window opening;
an outer flange, having an exterior surface, an interior surface and a distal end with an inner beveled edge;
a metal erosion shield, having a substantially symmetrical shape relative to a vertical axis, attached to the exterior surface of the outer flange; and
an annular rim, integrally disposed between the inner flange and the outer flange, defining a window pane opening; and a polymer adapter ring, attached to the interior surface of the outer flange, having a sloped inner surface that is substantially aligned with the inner beveled edge of the outer flange, the sloped inner surface configured for supporting a window pane assembly within the window pane opening.

12. The window frame assembly of claim 11, wherein the window frame comprises stamp-formed polyetherketoneketone (PEKK) material.

13. The window frame assembly of claim 11, wherein adapter ring comprises an injection-molded ring of carbon-filled polyetheretherketone (PEEK) material.

14. The window frame assembly of claim 11, wherein the adapter ring is bonded to the interior surface of the outer flange with a polysulfide sealant.

15. The window frame assembly of claim 11, wherein the erosion shield comprises a die-cut titanium alloy ring, having an inner lip with an arc of not more than 90°.

16. An outer window assembly for an aircraft, comprising:
a window frame of thermoplastic material, defining an outer window pane opening, having a substantially uniform thickness and cross-sectional shape, adapted for attachment in a window opening of an aircraft fuselage, including an outer flange having an exterior surface and an interior surface;
a metal erosion shield, of substantially constant cross-sectional shape, attached to the exterior surface of the outer flange;
a polymer adapter ring, bonded to the interior surface of the outer flange, having a sloped inner surface; and
an outer window pane assembly, mounted upon the sloped inner surface of the adapter ring within the outer window pane opening.

17. The outer window assembly of claim 16, wherein the window frame comprises stamp-formed polyetherketoneketone (PEKK) material.

18. The outer window assembly of claim 16, wherein adapter ring comprises an injection-molded ring of 30% carbon-filled polyetheretherketone (PEEK) material.

19. The outer window assembly of claim 16, further comprising a cured primer layer, disposed upon the interior surface of the outer flange, and a polysulfide sealant, disposed between the primer layer and the adapter ring, the sealant bonding the adapter ring to the outer flange.

20. The outer window assembly of claim 16, wherein the erosion shield comprises a die-cut titanium alloy ring, having an outer face, an inner lip, and an outer curved edge, each of the inner lip and the outer curved edge having an arc of not more than 90° relative to the outer face.

21. The window frame assembly of claim 1, wherein the adapter ring has a triangular cross-section.

22. The window frame assembly of claim 4, further comprising a fillet seal between the adapter ring and the annular rim.

* * * * *